Patented May 10, 1949

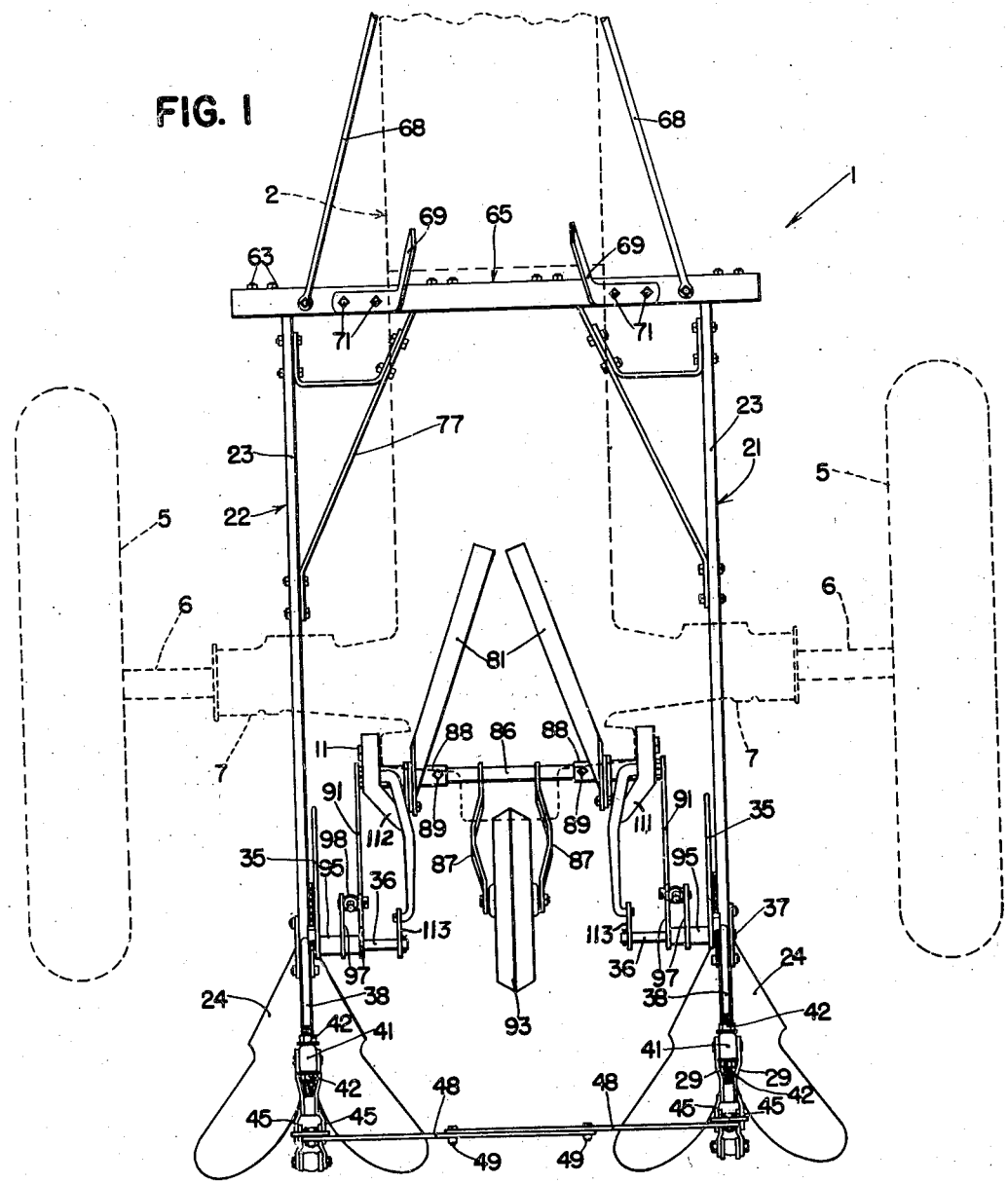

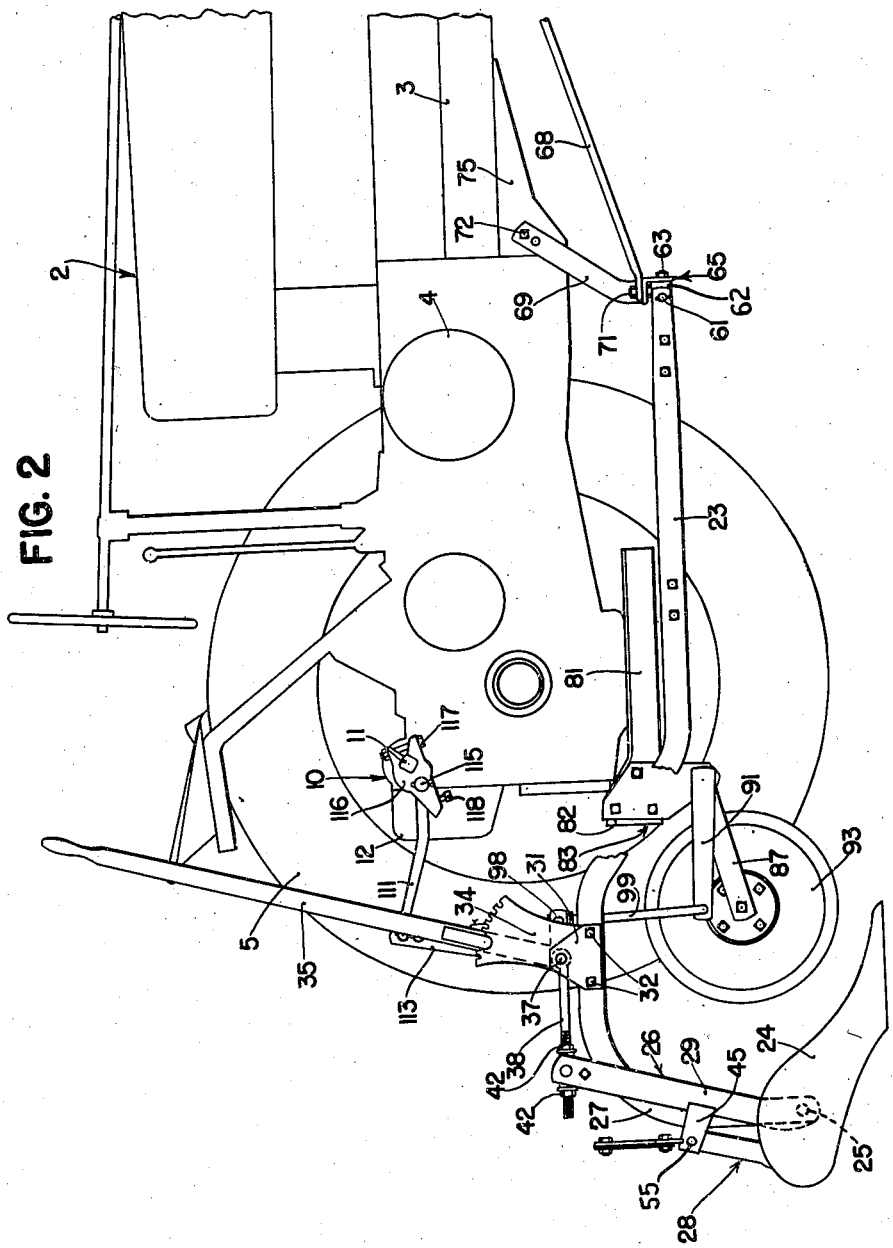

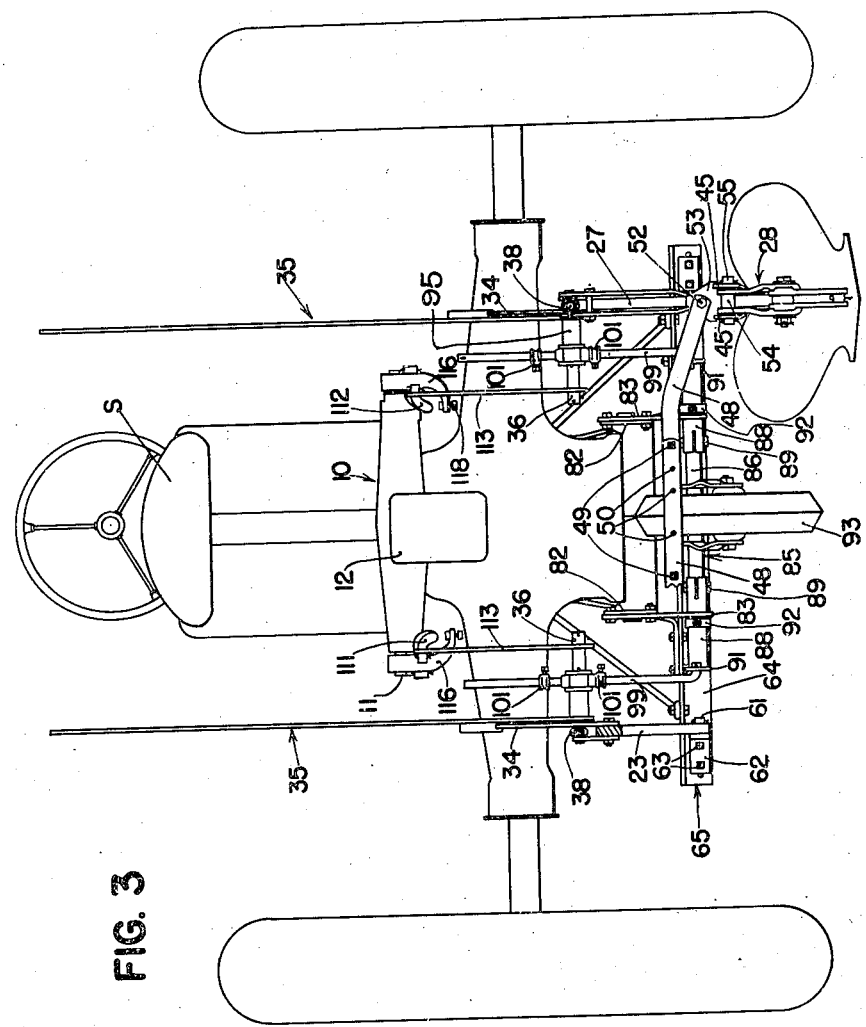

2,469,996

UNITED STATES PATENT OFFICE 2,469,996

TRACTOR MOUNTED PLOW AND
GAUGE WHEEL

Walter H. Silver and John I. Cantral, Moline, Ill., assignors to Deere & Company, Moline, Ill., a corporation of Illinois Application November 8, 1944, Serial No. 562,472

12 Claims. (Cl. 97—47)

1

The present invention relates generally to agricultural implements and more particularly to tractor mounted ground working tools.

The object and general nature of the present invention is the provision of an agicultural implement of the tractor mounted variety in which a pair of laterally spaced tools are controlled as to their operating depth by means of a single generally centrally disposed gauge means which operates to control the operating position of both of the tools. More particularly, it is a feature of the present invention to provide a two-row lister or middlebreaker of this type, wherein the centrally disposed gauge means is swingably connected with the tractor and has suitable connections with the two lister beams whereby the depth of operation of both units is controlled by the single centrally disposed gauge means. A further feature of this invention is the provision of a two-row lister having a single centrally disposed gauge means for controlling the depth of operation, which gauge means takes the place of the conventional gauging mechanism which usually includes a separate gauge wheel for each lister bottom.

An additional feature of the present invention is the provision of new and improved means embodying a power lift on the tractor operatively connected to raise not only the lister beams but also the centrally disposed gauge means but without interfering with the operation of the latter in determining the depth of plowing of the tools when the latter are lowered into their operating position. Further, it is a feature of this invention to provide gauging mechanism including a centrally disposed gauging means and connections with the tools whereby disposing the latter in different lateral positions is readily accommodated without in any way interfering with the action of the gauging means.

These and other objects and advantages of the present invention will be apparent to those skilled in the art after a consideration of the following detailed description, taken in conjunction with the accompanying drawings.

In the drawings:

Figure 1 is a plan view of a two-row power lift lister or middlebreaker in which the principles of the present invention have been incorporated.

Figure 2 is a side view, and Figure 3 is a rear view of the implement shown in Figure 1.

The implement chosen to illustrate the principles of the present invention is a two-row power lift lister or middlebreaker, indicated in its entirety by the reference numeral 1 and is shown

2 as carried by supporting means in the form of a farm tractor 2. The tractor 2 is of conventional construction, embodying supporting frame means 3 carrying a motor 4 which serves to drive a pair of rear traction wheels 5 fixed to axle shafts 6 that are carried in extensions 7 forming a part of the rear axle of the tractor. The tractor 2 is provided with a power lift indicated in its entirety by the reference numeral 10 and including a power lift rockshaft 11 carried at the rear of the tractor and rockable about a transverse axis through a range of approximately sixty degrees from raised to lowered position, under the control of a valve box 12 and a foot pedal or other control levers (not shown). The power lift mechanism 10 is substantially like that shown in the United States Patent No. 2,107,760, issued February 8, 1938, to E. McCormick et al., and reference may be made to that patent for further details if desired.

According to the principles of the present invention, the implement 1 includes right and left hand units 21 and 22, each of which has a beam 23 extending generally longitudinally and at its rear end carrying a ground working tool in the form of a furrow opener 24. The furrow opener 24 shown is a lister or middlebreaker bottom and is of conventional construction. The furrow opener 24 of each unit is pivoted, as at 25, to the lower end of a standard 26 which, in turn, is pivoted at the same point 25 to the lower end of the curved section 27 constituting a part of the beam 23. An overload toggle linkage 28 normally holds the tool 24 in rigid relationship with respect to the standard 26. The latter preferably is in the form of a pair of strap members 29 disposed on opposite sides of the curved section 27 of the beam 23.

Just forward of the curved section 27, each beam carries a pair of brackets 31, bolted to the beam, as at 32, and one of these brackets is extended, as at 34, to form a notched sector for a depth adjusting lever 35 that is mounted on a laterally inwardly extending stud 36 that is carried by the two associated brackets 31. The laterally outer end of each of the studs 36 extends through the outer bracket 31, as indicated at 37, and this extended end portion of each stud receives the eye of an associated threaded eyebolt 38, the rear threaded end of which extends through a trunnion member 41 pivoted to the upper ends of the straps forming the standard or shank 26. Lock nuts 42 provide means for adjusting the position of the standard 26 on the eyebolt 38 associated therewith. Each toggle linkage 28 is connected by a pair of brackets 45 to the associated standard 26, and a pair of spreader bars 48, connected together adjustably by a pair of bolts 49 insertable in openings 50 optionally, connect the rear ends of the beams 23. Preferably, the ends of the spreader bars 48 are pivoted, as at 52, to an attaching clip 53, each of which includes a short sleeve section 54 disposed about the pin 55 that connects the upper end of the toggle linkage 28 to the associated standard lugs 45.

The front end of each of the beams 23 is pivoted on a stud 61 secured to an attaching clip 62 that is bolted, as at 63, to any pair of a number of pairs of openings formed in the forward flange 64 of a draft angle 65 that is carried by the tractor. Preferably, the draft angle 65 is connected by a pair of draft rods 68 to the front end of the tractor and is supported from the central portion of the tractor by a pair of hanger straps 69 bolted, as at 71, to the horizontal flange of the angle 65 and secured by bolts 72 to the attaching bracket 75 that forms a part of tractor. Preferably, the upper ends of the hanger straps 69 are provided with a plurality of apertures so that the height of the angle 65 may be adjusted as may be desired, as to accommodate different tractors and/or different heights of hitch. Each beam 23 has a diagonally inwardly extending brace 77 bolted at its rear end to the beam 23 and pivoted at its forward end to a clip similar to the clip 62 attaching the beam 23 to the draft angle 65. The forward vertical flange of the angle 65 has a plurality of openings receiving the bolts by which the aforesaid clips are connected to the draft angle so as to accommodate disposing the beams in different lateral positions relative to the tractor, thus providing means whereby the lateral spacing between the furrow openers 24 may be varied.

Secured to the underside of the tractor rear axle, at the central portion thereof, is a pair of drawbar support angles 81 which, at their rear ends, have their horizontal flanges bent upwardly, as at 82, to form an attaching section. A bracket 83 is bolted at two or three points to each of the aforesaid attaching sections and at its lower portion is apertured to rockably receive a gauge wheel transverse shaft structure 85. The latter comprises a central shaft member 86 to which a pair of arms 87 are fixed, as by welding, and which extend generally rearwardly. A sleeve 88 is extended through each of the brackets 83, and each sleeve 88 has its inner end split and apertured to receive a clamping bolt 89 which is passed through an opening in the associated outer end portion of the transverse shaft 86 so that the sleeves 88 may be secured rigidly thereto and serve as an integral part thereof. The outer end of each of the sleeves 88 has an arm 91 secured as by welding. The shaft 86 is provided with a plurality of openings receiving the bolts 89 so that the sleeves 88 may be spaced closer together or farther apart, as desired. Set screw collars 92 on the sleeves 88 at the outer sides of the brackets 83, serve to retain the gauge wheel shaft structure in lateral position. By adjusting the sleeves 88 on the shaft 86 or the collars 92 on the sleeves 88, the shaft structure is readily accommodated to different tractors having, for example, different spacings between the brackets 83. A center gauge wheel 93 is journaled by suitable bearing means in the outer ends of the arms 87, the gauge wheel 93 being disposed centrally between the furrow openers 24.

Mounted on each of the inwardly extending studs 36 that is fixed to the rear portion of each of the beams 23, is the hand lever 35 mentioned above. Each hand lever 35 includes as a part thereof a sleeve 95 which is disposed on the associated stud 36. The inner end of the sleeve carries a pair of arms 97, preferably welded to the sleeve 95, and the outer ends of the arms 97 are apertured to receive trunnion members 98, and through each trunnion member a link 99 extends. The lower end of each of the links 99 is bent laterally inwardly and inserted in an opening in the associated gauge wheel arm 91, as best shown in Figures 2 and 3. Each of the links 99 carries a pair of set screw collars 101. Each of the lower collars 101 serves as a stop which is positioned by the single centrally disposed gauge wheel 93 for limiting the permissive downward movement of each of the beams 23. The tractor power lift 10 mentioned above includes a pair of lifting arms 111 and 112 connected by links 113 to the inner ends of the two studs 36. The inner or forward end of the lifting arms 111 and 112 is pivoted, as at 115, in a casting 116 that is clamped, as at 117, to the end of the power lift rockshaft 11. The construction is such that the lifting arms 111 and 112 are free to move upwardly relative to the associated casting 116, but when the power lift rockshaft 11 is actuated to raise the tools, a set screw 118 comes up into contact with the lifting arm associated therewith so that continued rocking movement of the power lift rockshaft 11, in a clockwise direction as viewed in Figure 2, the lifting arms 111 and 112 act through the links 113 to raise both of the tools. Further, when the continued upward movement of the links 113 raises the trunnion members 98 up along the rods 99 until they engage the upper set screw collars 101, the gauge wheel 93 and associated parts is also raised out of contact with the ground. The extent to which the tools may be raised before raising the gauge wheel 93, may be varied by fixing the upper set screw collars 101 in different positions along upper portions of the links 99, and as mentioned above, the working position of each of the tools, as determined by the single gauge wheel 93, may be adjusted by fixing the lower collars 101 in different positions along the links 99. Further, variations in the working position of the tools relative to the gauge wheel may be made at any time desired from the operator's station S on the tractor by manipulating one or the other, or both, of the hand levers 35.

In operation, the single centrally disposed gauge wheel 93 determines the operating depth for both of the furrow openers 24 and provides a construction in which both the gauge wheel and the tools may be brought close up behind the tractor, producing a very short coupled outfit by which short turns may readily be made. The single gauge wheel is stabilized by the tractor, by virtue of the transverse shaft structure, yet the bottoms 24 are gauged entirely from the ground and is independent of the tractor so far as vertical displacement of the latter is concerned, as by passing over uneven ground. The gauge wheel 93 is relatively small and readily cuts through clods and the like, thus avoiding momentary displacement of the tools. Further, by having only a centrally disposed gauge wheel, it is unnecessary to adjust the implement when operating it along ridges in which the slopes at one side are different from the slopes at the other side due, for example, to soil drifting by wind and the like. Under such conditions, for example, an implement having individual gauge wheels would have to be readjusted every time the machine is turned to go in the other direction.

While we have shown and described above the preferred structure in which the principles of the present invention have been incorporated, it is to be understood that our invention is not to be limited to the particular details shown and described above, but that, in fact, widely different means may be employed in the practice of the broader aspects of our invention.

What we claim, therefore, and desire to secure by Letters Patent is:

1. An agricultural implement comprising a wheel supported frame, a pair of laterally spaced generally vertically movable tools connected with said supporting frame for independent movement relative thereto, a ground engaging gauge means swingably connected with said supporting frame means and including a rockshaft journaled on said supporting means and defining the axis of swinging movement of said gauge means and rockable with swinging of the latter, a pair of arms fixed to the ends of said rockshaft, and means connecting the ends of said arms with said tools, respectively.

2. An agricultural implement comprising a wheeled supporting means, a pair of laterally spaced arms mounted on said supporting means for swinging movement relative thereto about a transverse axis, a centrally disposed gauge means swingably connected with said supporting means and connected with both of said arms, a pair of laterally spaced generally vertically shiftable tool means, and means connecting the latter with said arms, respectively, whereby the vertical position of each of said tool means is controlled by said central gauge means.

3. A tractor mounted lister comprising right and left hand tool units, means for shiftably connecting said units with the tractor, ground engaging gauge means swingably connected with the tractor and disposed generally centrally between said units, a lever adjustably mounted on each of said tool units, and connecting means extending, respectively, from said levers to said gauge means whereby said gauge means serves to determine the operating depth of said units.

4. A tractor mounted implement comprising a pair of laterally spaced generally longitudinally extending beams, each having a ground working tool at the rear end thereof, a transverse draft member fixed to the tractor and having means receiving the front ends of said beams in different lateral positions, a pair of laterally spaced brackets carried by said tractor, a transverse shaft rockably supported in said brackets, a centrally disposed gauge means connected with the central part of said rockshaft for swinging the latter, a pair of members fixed, respectively, to the outer ends of said rockshaft in different positions of lateral adjustment thereon, and means carried, respectively, by said beams and acting against said members, respectively, whereby said centrally disposed gauge means acts through said rockshaft and associated parts for determining the operating depth of said tools, the lateral adjustment of said members on said rockshaft serving to accommodate different lateral positions of said beams relative to the tractor.

5. The invention set forth in claim 4, further characterized by power lift means for raising both said beams and said gauge means out of ground engaging position.

6. In a tractor mounted implement, a pair of laterally spaced tool means connected with the tractor for independent generally vertically swinging movement, a centrally disposed gauge means swingably connected with the tractor and having a pair of parts and a lost motion connection between said parts, respectively, and said tool beams, lifting means carried by the tractor and connected with said tool beams for raising the latter into a transport position, and means associated with said lost motion connections for also raising said gauge means with said tool beams after the latter have been raised at least part way into their raised position.

7. An agricultural implement comprising supporting means, a pair of tools connected therewith in laterally spaced relation, a generally centrally disposed gauge means between said tools, each of the latter having a laterally inwardly extending part, a lever adjustably mounted on each of said parts and having an arm, and connections extending, respectively, from said arms to said centrally disposed gauge means whereby the operating position of either of said tools may be adjusted by operation of said gauge means.

8. A tractor mounted implement adapted to be mounted on a tractor having a pair of drawbar support angles, a pair of brackets adapted to be attached to the rear ends of said angles, vertically swingable ground engaging means connected with said brackets and including a transverse rockshaft supported for rocking movement in said brackets and a gauge wheel and arm means connecting said gauge wheel with said transverse shaft and disposed generally centrally between said brackets, a pair of independently shiftable tools connected with the tractor, and means connected between the outer portions of said transverse shaft and said tools whereby said gauge means controls the operating position of both of said tools.

9. An agricultural implement comprising supporting means, a pair of tools connected therewith in laterally spaced relation, a generally centrally disposed gauge means between said tools, each of the latter having a laterally inwardly extending part, a member adjustably mounted on each of said parts, connections extending, respectively, from said members to said centrally disposed gauge means whereby the operating position of either of said tools may be adjusted by operation of said gauge means, and means operatively connected with said parts for raising both of said beams into their raised position.

10. A tractor mounted implement comprising a pair of laterally spaced tool beams pivotally connected with the tractor at their forward ends and carrying tool means at their rear ends, an inwardly extending part fixed to each of said beams, said tractor having a power lift rockshaft and means connecing the ends of said rockshaft with said laterally inwardly extending parts, respectively, a centrally disposed gauge member swingably connected with the tractor and including a pair of vertically swingable arms, connections between said arms and said parts, respectively, said connections serving to limit the downward movement of either or both of said tool means relative to said centrally disposed gauge means, and means for raising said centrally disposed gaupe means out of contact with the ground when operation of said transverse rockshaft acts through said parts to raise both of said tool means.

11. A tractor mounted implement adapted to be mounted on a tractor having a pair of drawbar support angles, a pair of brackets adapted to be attached to the rear ends of said angles, vertically swingable ground engaging means connected with said brackets and disposed generally centrally between said brackets, a pair or independently shiftable tools connected with the tractor, means connected between said gauge means and said tools whereby said gauge means controls the operating position of both of said tools, and a part movably mounted on each of said tools and connected with said central gauge means, a pair of adjustable members mounted on said tools, and means connecting said adjustable members with said movable parts, respectively.

12. A tractor mounted implement comprising a pair of laterally spaced earth working tools, each having a generally longitudinally extending beam independently swingably connected with the tractor, generally centrally disposed gauge means movably connected with the tractor and including a pair of laterally spaced shiftable parts, a pair of adjustable members, one mounted on each of said beams, and a pair of connecting links, one connecting each of said adjustable members with the associated swingable part, whereby said gauge means determines the operating depth of said tools.

WALTER H. SILVER.
JOHN I. CANTRAL.

REFERENCES CITED

The following references are of record in the file of this patent:

UNITED STATES PATENTS

| Number | Name | Date |
|---|---|---|
| 1,817,085 | Lindgren et al. | Aug. 4, 1931 |
| 2,249,807 | Brown | July 22, 1941 |
| 2,249,861 | Silver | July 22, 1941 |
| 2,332,720 | Hipple | Oct. 26, 1943 |